United States Patent [19]
Gaiser

[11] Patent Number: 5,610,875
[45] Date of Patent: Mar. 11, 1997

[54] 3-D CONVERTED SHEAR WAVE ROTATION WITH LAYER STRIPPING

[75] Inventor: James E. Gaiser, Littleton, Colo.

[73] Assignee: Western Atlas International, Inc., Houston, Tex.

[21] Appl. No.: 536,429

[22] Filed: Sep. 29, 1995

[51] Int. Cl.$^6$ .............................. G01V 1/00; G01V 1/36
[52] U.S. Cl. ............................................ 367/75; 364/421
[58] Field of Search .................................. 367/37, 38, 75, 367/56; 364/421; 175/40, 45, 50

[56] References Cited

U.S. PATENT DOCUMENTS

| | | | |
|---|---|---|---|
| 4,736,349 | 4/1988 | Goins et al. | 367/75 |
| 5,060,203 | 10/1991 | Winterstein | 367/75 |
| 5,136,554 | 8/1992 | Thomsen et al. | 367/75 |
| 5,142,501 | 8/1992 | Winterstein | 367/75 |
| 5,343,441 | 8/1994 | Alford | 367/75 |

OTHER PUBLICATIONS

Alford, R. M., Amoco Production Co., "Shear Data in the Presence of Azimuthal Anisotropy: Dilley, Texas", Seismic 9, S9. 6, pp. 476–479.

Garotta, Robert and Granger, Pierre Yves; CGG, France, "Acquisition and Processing of 3C × 3-D Data Using Converted Waves", S 13. 2, pp. 995–997.

Mallick, Subhashis and Frazer, L. Neil, "Reflection/transmission coefficients and azimuthal anisotropy in marine seismic studies", Geophys. J. Int. (1991) 105, 241–252.

Primary Examiner—Ian J. Lobo
Attorney, Agent, or Firm—William A. Knox

[57] ABSTRACT

A method for using a compressional-wave source to produce converted shear waves which are subjected to Alford 4-component rotation to align the observation coordinates with the natural coordinates of the principal anisotropic axes of a birefringent formation. The static time shift between the fast and the slow shear wavefields due to shear-wave splitting is determined so that they can be synchronized thereby to isotropize the birefringent formation. From those data, fracture-plane orientation can be determined. Based on those data, the direction of a deviated bore hole is aligned perpendicular to the fracture plane strike. For a deep-seated target formation, shallower layers are isotropized prior to rotation and synchronization of the converted shear wavefields originating from that deeper formation.

6 Claims, 2 Drawing Sheets

3-D CONVERTED SHEAR WAVE ROTATION WITH LAYER STRIPPING

BACKGROUND OF THE INVENTION

1. Field of the Invention

A method for geophysical exploration using reflected converted shear waves derived from a compressional wave surface source. In a multilayer lithologic environment, the polarization angle of a target layer is defined by removing the birefringent effects of the overlying layers.

2. Discussion of Related Art

Seismic exploration is conducted primarily to provide petrophysical information about subsurface earth formations for the purpose of optimizing the location and configuration of boreholes used in the recovery of hydrocarbon products. The borehole shaft is configured to maximize fluid drainage from the vugs and crevices of the surrounding porous rocks. In the presence of vertical fracturing, the borehole may be deviated from a substantially vertical to a substantially horizontal axis. The specific seismic exploration approach to be employed in an area of interest is preferably tailored to display the particular geological conditions there existing, as will next be explained.

In the art of seismic exploration, a seismic source at or near the surface of the earth, radiates an acoustic wavefield that expands downwardly to insonify the elastic media comprising the rock layers beneath the surface. The seismic wavefield is reflected from the respective acoustic impedance interfaces between layers as a wavefront that propagates upwardly to an array of spaced-apart seismic receivers deployed at or near the surface of the earth, offset from the source by some desired spatial interval. The receivers detect the mechanical earth motions (or the pressure field variations in marine operations) due to the reflected seismic wavefield and convert the detected motions to electrical-signal amplitudes as a function of reflection travel time. The electrical time-scale signals are stored and processed, preferably in a programmed computer, to provide a model of the attitude and structure of the subsurface formations.

Seismic surveys may be 2-dimensional wherein a source or series of sources insonifies linear arrays of receivers along a single line of survey. In 3-D operations, the sources and receivers are distributed areally in a regular grid pattern over many square kilometers.

The source and receivers may be designed to be responsive to compressional (P) waves or shear (S) waves. P waves are longitudinal waves that propagate with particle motion perpendicular to the wavefronts as alternate compressional and rarefaction waves. P-wave receivers are responsive to vertical particle motion with respect to the surface of the earth.

Shear waves are polarized parallel to the wavefronts and are classified as SH waves and as SV waves for isotopic media. In the context of this disclosure, for SH waves, particle motion is horizontal in a plane that is transverse with respect to the line of profile. The particle motion for SV waves is in a vertical plane that is perpendicular to the SH particle motion and parallel to the line of profile. Shear waves cannot propagate in a fluid because fluids have no shear strength. Some media are birefringent to S-waves by reason of being anisotropic. That is, the acoustic energy splits into ordinary and an extraordinary ray paths characterized by different propagation velocities as fast ($S_f$) and slow ($S_s$) waves) during transit through a medium and with different polarization directions than pure SH or SV waves.

P-wave sources excite the earth along substantially vertical trajectories relative to the surface of the earth. S-wave sources are polarized to shake the earth horizontally. Either two such S-wave sources, orthogonally polarized, may be used at the same location or a single source may be used to first generate SH waves and then physically rotated 90° to generate SV waves.

P-wave exploration comprises the workhorse of seismic surveys. But special studies, that require additional exploration of the anisotropic characteristics of selected rock formations due to stress and fracturing, may be undertaken by combining S-wave and P-wave technology in a single survey effort. However, implementation of such a combined survey would require use of three separate sources, viz.: P-wave, SH-wave and SV-wave sources, at each source station and multicomponent receivers that incorporate both P-wave and S-wave seismic receiver units at each receiver station. The need for three separate sources triples the survey costs prohibitively.

It is known that a compressional wavefront, impinging on an acoustic impedance interface, will generate not only a reflected and a refracted P-wave, but also an upward-traveling reflected converted (PS) shear wave. Thus, a single P-wave source in combination with a multicomponent receiver array, could be economically employed for a combined P-wave, S-wave survey using converted PS (compressional/shear) shear waves in place of pure SS (shear/shear) shear waves.

In U.S. Pat. No. 4,736,349, issued Apr. 5, 1988, Neal R. Goins teaches a method for obtaining shear wave data from common-depth-point-gathered compressional wave traces, corrected for angularity and spherical spreading, using variations in the amplitude of the gathered compressional waves as a function of source-receiver offset. That is said to be possible because the amplitude of embedded reflected shear wave energy components varies as the angle of incidence. At vertical incidence the reflection coefficient for shear waves is near zero, increasing to a maximum in the range of 30°–45°. P-waves on the other hand are not so affected. Those data can be used to generate pseudo-shear wave seismic sections. Thus, although Goins uses a P-wave source and shear-wave amplitude data derived therefrom, he does not use converted shear waves explicitly.

Garotta and Granger, in a paper entitled *Acquisition and processing of 3C×3D data using converted waves*, published in Expanded Abstracts for the 58th Annual SEG International meeting, 1988, pp 995–997, employ a 2-component, transverse and radial receiver rotation and an angle-dependent scaling algorithm followed by cross correlation between the data that propagate in orthogonal directions to determine the optimum angles of rotation. The method becomes unstable when the transverse component is small. The method does not explicitly combine energy polarized in different directions at common conversion points and it is therefore only sensitive to the principal near-surface shear wave coordinates.

Mallick and Frazer in a paper entitled *Reflection/transmission coefficients and azimuthal anisotropy in marine seismic studies*. published in the Geophysical Journal Int, (1991) v. 105, pp 241–252, teach a method wherein a two-component ocean bottom seismometer (OBS) is emplaced on the sea floor. A surface air gun is fired at spaced-apart intervals along two separate lines of survey at right angles to each other to generate converted P to S reflections at acoustic interfaces and water-bottom converted shear wave signal components $x_\perp, x_\parallel, y_\perp, y_\parallel$. They then apply an Alford rotation operator (to be explained below) to the signal components to define the azimuthal direction of birefringence, the strike of a fracture plane for example. The method applies the same rotation angle for both receiver and source orientations and therefore is only sensitive to the principal directions of anisotropy at the water bottom.

In the real world, the alignment of a line of survey with respect to a fracture plane or the principle anisotropic axis of a formation is not known a priori. R. M. Alford, in SEG Expanded Abstracts, 56th Annual Meeting of the Society of Exploration Geophysicists, pp 476–479, which is incorporated herein by reference, teaches mathematical rotation operators which may be applied to multi-component, multi-source PS shear-wave data to align the observation coordinate frame with the natural coordinate system of the earth. As developed by Alford, a 4-component rotation is applied to vertically propagating S-waves in a 1-D earth at a given common midpoint. Those components consist of in-line S-wave source signals, detected by in-line and cross-line receivers and cross-line source signals detected by the same two in-line and cross-line receivers. This provides a 2×2 matrix of 4-component S-wave data as a function of time. The two diagonal elements of the matrix are the in-line S-wave source signals detected by the in-line horizontal receiver and the cross-line source signals detected by the cross-line horizontal receiver. The off-diagonal elements of the 2×2 matrix are the in-line S-wave source signals detected by the cross-line receiver and the cross-line S-wave source signals detected by the in-line horizontal receiver. The orthogonally-polarized sources and receivers are mathematically iteratively rotated by angular increments. Upon convergence, when aligned with the preferred earth coordinate system, the diagonal components of the matrix will contain the principle S-wave energy and the off-diagonal elements will contain little or no coherent S-wave energy. The teachings of that paper are confined to symmetrical SS shear wave field data and only provide polarization information of the near-surface layers.

The object of shear wave studies is to learn something about the principle polarization axis of a target formation. In the presence of anisotropic material above the target formation, the perceived surface axial rotation will be distorted; it will reflect the axial alignment of the uppermost anisotropic layer. Donald F. Winterstein, in U.S. Pat. No. 5,060,203, issued Oct. 22, 1991, teaches a method for stripping off the influence of upper layers to predict the subsurface stress regimes. Winterstein analyzes and removes the polarization changes of split S-waves as a function of depth using the direct downgoing wavefield in 4-component S-wave vertical seismic profile (VSP) data. His approach involves an application of the Alford rotation operators to minimize the energy on the off-diagonal components at the shallow-most level. The observed time shift of the two principal S-waves on the diagonal components is removed by time-shifting the slow S-wave to align with the fast S-wave. That time shift corresponds to removing the source delay and so is applied to two of the four seismic components and effectively removes the azimuthal anisotropy thus making the material between the source and the shallow medium isotropic. The process may be applied to additional layers as needed. The process is primarily applicable to VSP operations using shear waves wherein a unidirectional trajectory exists between a surface source and a down-hole receiver (or the reverse by reason of the principle of reciprocity). He does not teach application of the method to converted shear waves gathered along conventional surface line-surveys or 3-D operations.

An important purpose of shear-wave seismic surveys is to determine the strike of vertical fracture planes of a subsurface, target earth formation. In the oil country, horizontal boreholes are drilled, deviated to extend perpendicularly to the strike of the fracture planes to thereby maximize hydrocarbon fluid recovery.

There is a need for an economical robust method for measuring the orientation of the principle axis of a target formation, lying beneath a birefringent medium, using a P-wave source for generating converted shear waves.

SUMMARY OF THE INVENTION

A method for seismic exploration is provided by radiating a compressional wavefield from a seismic source positioned at a first location. A first receiver station is established spaced apart from the source along a first azimuth. A first multicomponent receiver detects first and second signal components representative of the fast and slow components of converted shear wave energy reflected from a conversion point that lies on an acoustic interface beneath a birefringent formation. A second compressional wavefield is radiated from a second source location. A second multicomponent receiver detects third and fourth signal components that are representative of the fast and the slow components of converted shear wave energy reflected from the subsurface conversion point. The first, second, third and fourth signal components are formed into a 2×2 matrix. A four-component rotation operator that minimizes the energy of the off-diagonal components of the matrix, is applied to the four members of the matrix to define the principal polarization angle of the shear wave components. The information thus gathered is used to direct the direction of a deviated borehole.

In an aspect of this invention, the time lag is measured between the fast and the slow diagonal shear wave components of the rotated matrix. A static shift is applied to one of the components to compensate for the time lag, thereby to virtually isotropize the overlying birefringent medium. The interface is then imaged.

In another aspect of this invention, the imaging of successively deeper acoustic interfaces is downward continued by sequentially isotropizing deeper birefringent media.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PRESENTLY PREFERRED EMBODIMENT

Figure 1:
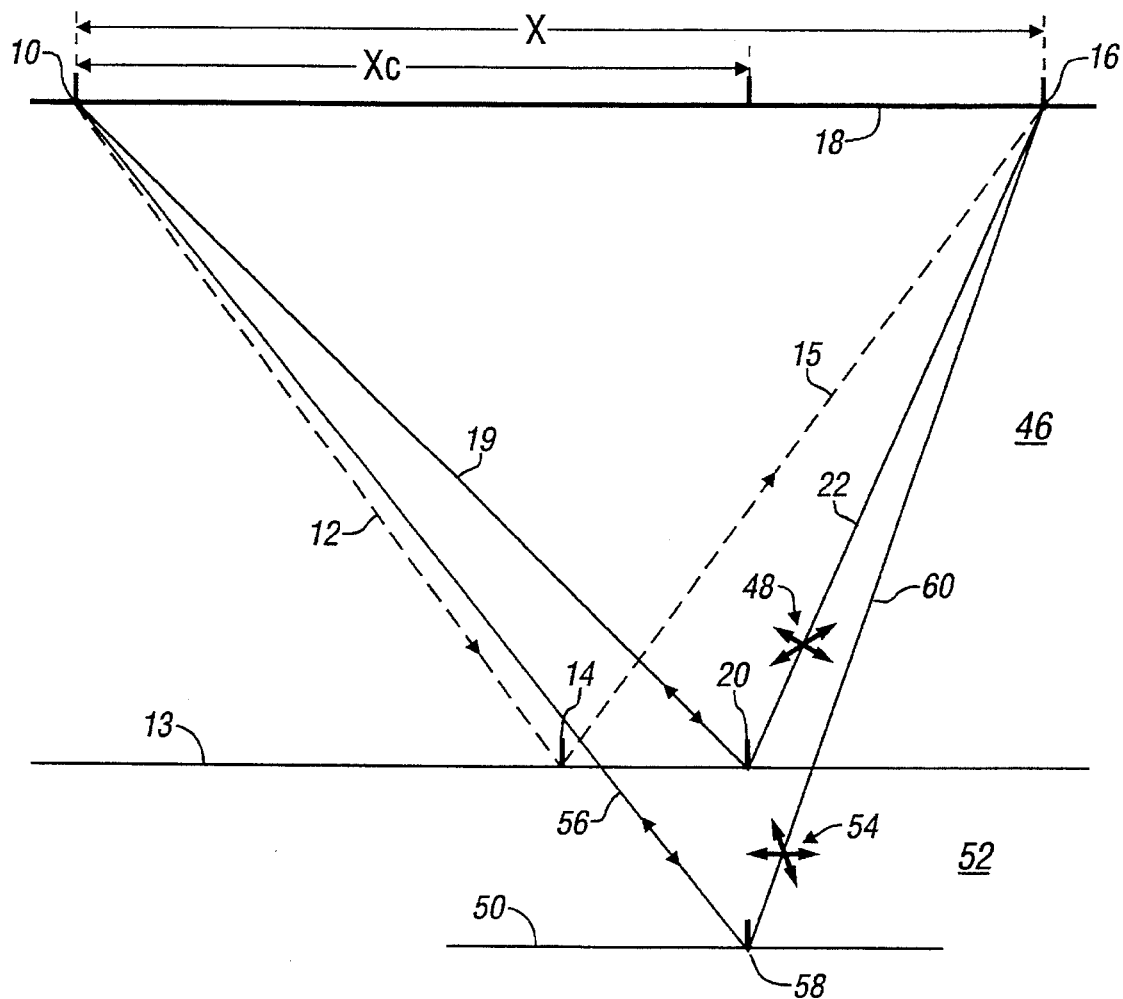
FIG. 1 illustrates possible ray paths for converted shear waves as compared to compressional waves.

FIG. 1 illustrates the basic principles of wavefield propagation by mode conversion. A compressional wavefield radiating from a source 10 propagates along dashed trajectory 12 where it is reflected from an acoustic interface 13 at incident point 14, whence it propagates along ray path 15 to a multicomponent receiver 16. Incident point 14 lies at the midpoint between source 10 and receiver 16 for flat layering. Incident point 14 may provide a common depth point (CDP) for source and receiver arrays symmetrically disposed about point 14 along surface 18. The symmetrical ray paths shown by the dashed trajectory applies to a P-wave source working into a P-wave receiver or a polarized S-wave source working into a matched polarized shear wave receiver.

As is well known, a P-wave propagating along trajectory 19, impinging upon an acoustic interface such as 13 may undergo mode conversion as a PS wave polarized in two orthogonal directions as $S_f$ and $S_s$ wavefields. The converted shear waves are reflected from interface 13, not at mid point 14, but from a conversion point 20 along ray path 22 to be detected by a 3-component multicomponent receiver 16. Conversion point 20 is shifted away from midpoint 14 towards the receiver in accordance with the S-wave/P-wave velocity ratio. Thus, the horizontal offset $X_c$ between source location 10 and conversion point 20 is approximated by $$X_c = X/[1+(T_s V_s^2)/(T_p V_p^2)] \quad (1)$$

where $T_s$, $T_p$, $V_s$, $V_p$ are respectively the S-wave and P-wave two-way travel times and S-wave and P-wave rms velocities to the acoustic interface of interest. In data processing using converted shear-wave (PS) data, the concept of CDP (common depth point) as applied to P-wave data is supplanted by the term CCP (common conversion point) for PS-wave data.

Figure 2:
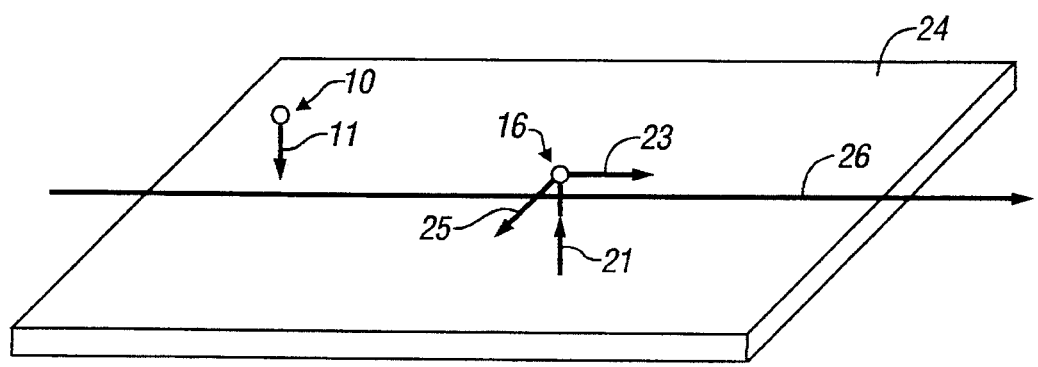
FIG. 2 provides definitions for terms used herein.

FIG. 2 provides definitions for terminology used herein. An element of the near-surface is indicated by 24 along which the direction of progress line of survey 26 has been laid out. As explained earlier, P-waves are polarized with particle motion substantially in line with the direction of propagation. A P-wave source such as 10 excites a substantially vertical particle motion as indicated by arrow 11. A multicomponent receiver 16 responds to upcoming P-waves along vector 21, to in-line converted shear waves along 23 and to cross-line converted shear waves as indicated by 25.

As above explained, a multi-component receiver includes a sensor unit that is responsive to cross-line shear energy and a sensor unit that is responsive to in-line shear energy. Assuming that the responsive axes of a multi-component receiver are exactly aligned with the axes of polarization of the incoming wavefield, each sensor unit would detect only a single component of the shear seismic-energy wavefield. The off-axis sensor unit would have substantially zero energy. But it would indeed be fortuitous if the above condition actually existed. In general, each shear wavefield contributes a vectorial portion to each sensor unit in terms of angular polarization and magnitude.

Stratified earth media, particularly vertically fractured formations, may be azimuthally anisotropic and therefore birefringent to shear waves, creating temporal S-wave splitting. The fast S-wave component is polarized parallel to strike of the fracture plane. It is desired to resolve the orientation of the axis of polarization so that a borehole can be deviated in a direction, preferably perpendicular to strike, that is optimal for the recovery of natural resources.

Figure 3:
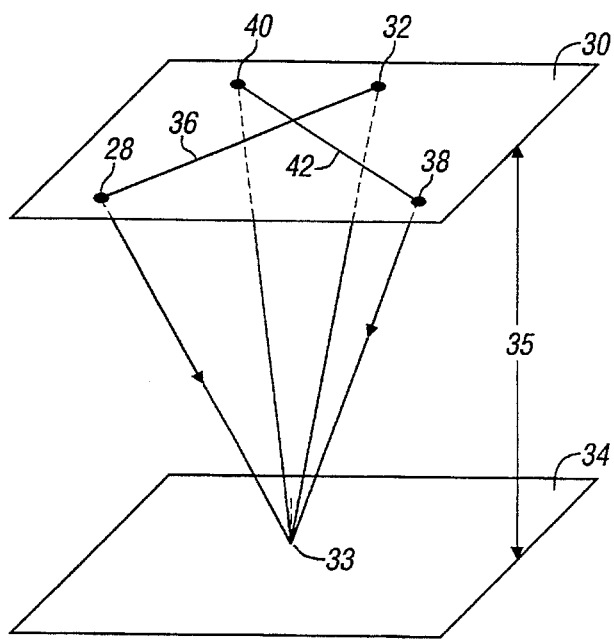
FIG. 3 is a simplified showing of a method of this invention.

Please refer to FIG. 3 representing a vertical section of the earth. A compressional wavefield is radiated from a first source location 28 on surface 30. At a first receiver station 32, first and second converted shear-wave energy signal components, reflected from a conversion point 33, are detected by one or more in-line and cross-line multi-component receivers respectively. Conversion point 33 is associated with an acoustic interface 34. The volume between surface 30 and acoustic interface 34 is occupied by an anisotropic, birefringent medium indicated symbolically by 35. Receiver station 32 is spaced apart from source location 28 along a first azimuth 36.

A compressional wavefield is radiated from a second source location 38. After reflection from conversion point 33, third and fourth converted shear-wave energy components are detected by one or more cross-line and in-line multicomponent receivers respectively at a second receiver station 40 that is spaced apart from source location 38 along a second azimuth 42.

Figure 4:
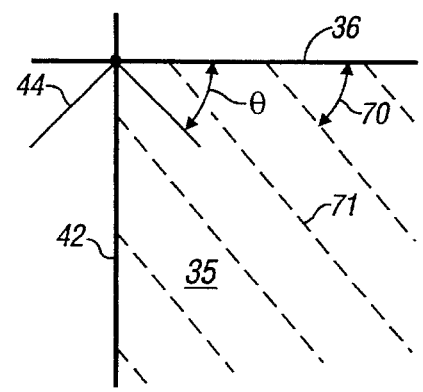
FIG. 4 shows the coordinate rotation geometry.

Please refer now to FIG. 4 which represents a horizontal section of the earth. First and second azimuths 36 and 42 are shown conceptually oriented at some angle θ, which may be defined in terms of north and east geographic coordinates, relative to the axial alignment of the vertical fracture planes, indicated by the diagonal dashed lines, of rock layer 35. An Alford rotation operator R is applied to the first, second, third and fourth detected signal components $s_1$, $s_2$, $s_3$, $s_4$, representative of the fast and slow converted shear wave energy components derived from the compressional wavefields radiated from source locations 28 and 38. Preferably, the operator is applied to each time-sample window (or depth interval). There are two rotation operators: one for the sources $[R_s]$ and one for the receivers $[R_r]$. The quantities are introduced into a 2×2 matrix of the form $$S' = R_r S R_s^T,$$

where the superscript $T$ indicates a transform. S' may be expanded as $$\begin{vmatrix} s_1' & s_2' \\ s_3' & s_4' \end{vmatrix} = \begin{vmatrix} \cos(\theta_r) & \sin(\theta_r) \\ -\sin(\theta_r) & \cos(\theta_r) \end{vmatrix} \begin{vmatrix} s_1 & s_2 \\ s_3 & s_4 \end{vmatrix} \begin{vmatrix} \cos(\theta_s) & -\sin(\theta_s) \\ \sin(\theta_s) & \cos(\theta_s) \end{vmatrix} \quad (2)$$

where $\theta_s$ and $\theta_r$ are the source and receiver rotation angles, the $S_i$ are the observed data, S'j are the data in the rotated coordinate frame.

In FIG. 4, the rotation angles $\theta_s$ and $\theta_r$ are equal. However, in general, those angles may be different, particularly in 3-D surveys, because the so-called in-line direction 26 (FIG. 2) is not necessarily aligned with the horizontal axes of the multicomponent receivers.

The effect of applying the rotation operator to the detected signals is to rotate the original coordinate frame 36–42 to refer the data signals to a new coordinate frame, indicated by 44, aligned with the natural coordinates for the azimuthally anisotropic medium 35. Formulation (2) may be solved iteratively by introducing incremental values for θ until the off-diagonal terms $s_2'$ and $s_3'$ are minimized.

The process of isotropizing or layer stripping of converted waves proceeds from shallow to deep formations. Layers in the analysis consist of one or more samples of data. Within each layer, an optimum Alford rotation is first determined by finding a source and a receiver rotation angle that minimize off-diagonal elements of the 2×2 shear wave data. Second, the time lag between the fast and the slow converted shear wave components is determined and a static shift is applied to one of the source components, preferably the slow component by way of example but not by way of limitation. The rotation and static shift are applied to all the data because deeper horizons have also travelled through the layer being analyzed. Following rotation and time shift, an imaging condition is invoked to retain and remove the reflectivity in the layer just analyzed. The effect of the coordinate rotation and time shifting is to effectively isotropize medium 35, i.e., the anisotropic attributes are effectively neutralized so that medium 35 now appears to a passing wavefield to be isotropic. In the next and successively deeper layers, the procedure moves downwards, repeating the Alford rotation, time shifting and imaging condition. The result is a measure of the orientation of the principal axes and magnitude of azimuthal anisotropy from the Alford rotation angles and the time shifts respectively.

Please refer back to FIG. 1. An anisotropic birefringent medium 46 occupies the volume between surface 18 and acoustic interface 13. The natural anisotropic axes for medium 46 are indicated by intersecting double-headed arrows 48 indicating the polarization directions of the fast and slow S-wave components for the converted shear waves propagating along trajectory 22. It is to be observed that the trajectory of both waves are shown to be coincident for simplicity. In actual practice, they are slightly separated.

A second interface 50 lies beneath interface 13, separated therefrom by an anisotropic formation 52 having natural polarization axes 54 that are rotated clockwise from the direction of axes 48 in formation 46. A compressional wavefield traveling along ray path 56 insonifies interface 50 at conversion point 58 to excite a converted shear wavefield that reaches receiver location 16 via ray path 60. In an actual physical environment, conversion point 58 would be shifted slightly to the left but has been shown as illustrated for clarity.

A portion of ray path 60 passes through medium 46 and therefore, the anisotropic effect of medium 46 will be superimposed on the shear wave signals from deeper interface 50, causing a further birefringence and S-wave rotations. Therefore to downward-continue the polarization analysis to deeper layers such as 52, the upper layer is isotropized. The Alford rotation operator and the static time shift between fast and slow shear wavefields for layer 46 can then be applied to the signals representative of the converted shear waves originating from conversion point 58 to remove the birefringent effect of layer 46 on those signals from layer 52.

Figure 5:
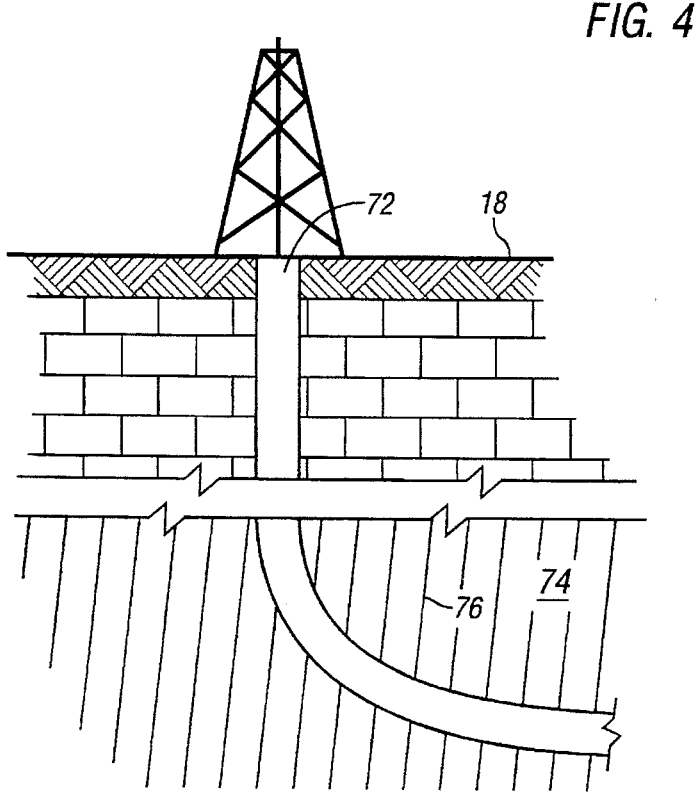
FIG. 5 shows the configuration of a deviated borehole relative to the strike of vertical formation fracture planes.

The orientation of the fast wavefield component of each layer of interest may define the azimuth of the fracture-plane strike, for example, in FIG. 4, the diagonal lineations 70, aligned with the fast anisotropic axis, might define the strike azimuth 71, referred to north and east geographic coordinates. In FIG. 5, a borehole 72, proposed to exploit the oil or gas content of a target formation 74, would be deviated horizontally, perpendicular to the formation fracture planes such as 76 where the strike is substantially perpendicular to the plane of the page.

For converted shear waves, the conversion point comprises a source location for the upward propagating shear wave energy. Isotropization or layer stripping can be successfully applied to converted shear waves because, for any layer, a polarized source and a polarized receiver are located on opposite sides of the medium under consideration in a manner analogous to Wintersteins's VSP method. It also is analogous to optical analysis of birefringent material wherein an analyzer can be rotated relative to a polarizer to compensate for the specific rotation of the sample under study. The effects of polarization characteristics of upper layers can be defined and successively removed from signals from deeper horizons to allow downward continuation of the imaging condition. That method cannot be applied to pure symmetrical S-wave-source data because both the source and the receiver are located at the surface.

In the presently preferred mode of operation, the field operations are arranged as in FIG. 3 although entire arrays, either 2-D or 3-D, would be used in practice. The orientation of the multicomponent receivers need not necessarily be aligned with the polarization direction of the source-receiver azimuth. Either prestack or post stack data may be processed for analysis although a prestack analysis would be expected to be more accurate to allow surface consistent solutions of polarization and static time shifts. Conventional computer-aided corrections for surface-consistent statics, dynamic angularity correction, DMO if needed and spherical spreading. The converted shear wave common-conversion-point gathers are examined and normalized for amplitude variation as a function of offset because, as earlier explained, the amplitude of reflected shear-wave energy is a function of incident angle such that the energy would be very weak for vertical incidence. Computer-processed data are displayed as seismic time sections or maps in the usual manner. The information with respect to the geographic orientation of the fracture-plane strike thus provided may then be used to directionally deviate a bore hole as previously explained.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A method for defining the geographic orientation of the principal axes of a birefringent medium for use in selecting the direction of deviation of a horizontal borehole relative to the strike of a lithologic fracture plane, comprising:

radiating a compressional wavefield from a first source location;

from a first receiver station spaced apart from said first source location along a first azimuth, detecting first and second seismic signal components representative of fast and slow converted shear-wave energy reflected from a subsurface conversion point associated with an acoustic interface beneath a birefringent medium;

radiating a compressional wavefield from a second source location;

from a second receiver station spaced apart from said second source location along a second azimuth substantially perpendicular to said first azimuth, detecting third and fourth signal components representative of fast and slow converted shear-wave energy reflected from said subsurface conversion point;

programming a digital computer to format said first, second, third, and fourth signal components into a 2×2 matrix, said matrix including diagonal and off diagonal terms;

with the aid of said computer, applying a four-term rotation operator to said matrix which minimizes the energy content of the off-diagonal terms of said matrix to define the orientation of the principal polarization axes of said birefringent medium as the fracture-plane strike; and deviating a borehole perpendicular to the so-defined strike.

2. The method as defined by claim 1, comprising:

measuring the time lag between the fast and slow diagonal shear-wave terms of said matrix;

applying a static time shift to one of the source components to compensate for the time lag between said fast and slow wavefields thereby to isotropize said birefringent medium; and imaging said acoustic interface.

3. The method as defined by claim 2, comprising:

downward continuing the imaging of successively deeper acoustic interfaces by isotropizing shallower birefringent media.

4. The method as defined by claim 2, comprising:

in a target formation characterized by substantially vertical fracture planes, defining the axial orientation of said fracture planes by isotropizing overlying birefringent formations.

5. A method for seismic exploration, comprising:

radiating a compressional wavefield from a first source location;

detecting first and second signal components at a first receiver station spaced-apart from said first source location along a first azimuth, said first and second signal components being representative of fast and slow converted shear-wave energy reflected from a conversion point associated with an acoustic interface beneath a birefringent medium;

radiating a compressional wavefield from a second source location;

detecting third and fourth signal components at a second receiver station spaced-apart from said second source location along a second azimuth substantially perpendicular to said first azimuth, said third and fourth signal components being representative of fast and slow converted shear-wave energy reflected from said conversion point;

programming a computer to create a 2×2 matrix from said first, second, third and fourth signal components, said matrix being characterized by diagonal and off-diagonal terms;

programming said computer to minimize the off-diagonal terms by applying an Alford rotation operator to said matrix to define the natural coordinate frame of the principal axes of birefringence;

programming said computer to measure the time difference between the fast and the slow shear wavefields represented by the diagonal terms of said rotated matrix and applying a corresponding static time shift to one of the source components to isotropize said birefringent medium; and imaging said acoustic interface.

6. The method as defined by claim 5, comprising:

downward-continuing the imaging of successively deeper acoustic interfaces by isotropizing superjacent birefringent media.

* * * * *